United States Patent [19]

Onda et al.

[11] Patent Number: 4,499,530
[45] Date of Patent: Feb. 12, 1985

[54] SWITCHING POWER SUPPLY APPARATUS

[75] Inventors: Kenichi Onda; Kojin Abe; Kohei Yabuno, all of Hitachi; Takeshi Uemura, Niigata, all of Japan

[73] Assignee: Hitachi, Ltd., Tokyo, Japan

[21] Appl. No.: 424,369

[22] Filed: Sep. 27, 1982

[30] Foreign Application Priority Data

Sep. 30, 1981 [JP] Japan .................. 56-153634
Mar. 30, 1982 [JP] Japan .................. 57-52546

[51] Int. Cl.³ .......................... H02M 3/335
[52] U.S. Cl. ........................ 363/17; 363/21
[58] Field of Search .............. 363/15, 16, 17, 20, 363/21, 27, 28, 96, 97, 98

[56] References Cited

U.S. PATENT DOCUMENTS 3,925,717 12/1975 Kinnard .................. 363/20
4,084,219 4/1978 Furukawa et al. .......... 363/97
4,156,273 5/1979 Sato ..................... 363/21

FOREIGN PATENT DOCUMENTS

52-14820 4/1977 Japan ..................... 363/21

Primary Examiner—William M. Shoop
Assistant Examiner—Jeffrey Sterrett
Attorney, Agent, or Firm—Antonelli, Terry & Wands

[57] ABSTRACT

In accordance with the present invention, there is provided a power supply apparatus comprising a primary winding of a main transformer and a semiconductor device with a control electrode connected in series between both electrodes of a DC power source, a drive current being fed to said control electrode of said semiconductor device via an auxiliary transformer, and output being obtained on a secondary winding of said main transformer by turning on and off of said semiconductor device, wherein a tertiary winding is provided on said main transformer and a negative polarity drive current is flowed into said semiconductor device via said tertiary winding when said semiconductor device is to turn off.

12 Claims, 16 Drawing Figures

SWITCHING POWER SUPPLY APPARATUS

The present invention relates to a switching power supply apparatus, and particularly relates to a switching power supply apparatus wherein a semiconductor device having a control electrode such as a transistor, a gate turn-off thyristor (GTO) or a MOS FET is employed as a switching element. This type of switching power supply is broadly used for IC or L51 devices.

For a conventional switching power supply apparatus employing transistors, a prior art arrangement wherein a transistor is driven via a base drive transformer is widely known. The prior art aims at reducing the turn-off time of a transistor by flowing the base current in the reverse direction as a result of releasing an exciting current stored in a base drive transformer. The drawback of the prior art is that in order to operate with a shorter conduction time of the transistor, the base current in the reverse direction is decreased and consequently the turn-off time of the transistor is prolonged. This is because the exciting current stored in the base drive transformer varies in proportion to the control time for controlling the conduction time of the transistor.

Further, as for a gate current required for turning off the GTO (hereafter referred to as an off-gate current), a shorter turn-off time can be obtained by flowing a faster rising pulse current. It is possible to realize a fast rising off-gate current by raising the voltage of the power supply feeding the off-gate current. However, the breakdown voltage between the gate and cathode of the GTO is approximately 20 volts and consequently the voltage of the power source which feeds the off-gate current is limited. In the conventional GTO circuit, the GTO has been quickly turned off, for example, by applying a higher voltage when the off-gate current begins to flow and lowering the output voltage of the gate circuit with the advance of turning off, resulting in a complicated gate circuit.

Further, as the capacity of a MOS FET becomes larger, the equivalent capacitance existing within a MOS FET is also increased. The switching time of a MOS FET is determined by the time for the equivalent capacitance existing between the gate electrode and the source electrode within the MOS FET (referred to as gate input capacitance) to be charged or discharged. Accordingly, it is necessary to let flow a current with a large peak value for making efficient use of the fast switching performance which is a characteristic of the MOS FET. This has resulted in the increased gate drive power and the increased size of a gate circuit.

In this way, it is possible to reduce the turning off time and to effect high frequency drive for the semiconductor with a control electrode such as the transistor, GTO and MOS FET by feeding a negative-polarity drive current which rises fast and has a large peak value. However, this brings about the increased drive power accompanied by a larger sized circuit and a complicated drive circuit. As a result, it has been impossible to realize high frequency driving easily.

An object of the present invention is to provide a small-sized, highly efficient switching power supply apparatus wherein high frequency operation is facilitated and the power of the power supply for the drive circuit of a semiconductor device having a control electrode is reduced by letting flow a negative polarity drive current having the fast rise time as well as a large peak value from the main circuit to the semiconductor device using a simple constitution in order to turn off the semiconductor device quickly.

Another object of the present invention is to provide a more reliable switching power supply apparatus by maintaining the above described negative polarity drive current until the semiconductor device completely turns off.

The present invention utilizes the fact that a semiconductor device is held in the conduction state during the minority carrier storage time even after a turning-off direction is issued to the semiconductor device. In case a load is fed with power via the main transformer, the voltage remains to be induced in respective windings of the main transformer during the storage time of the semiconductor device. In view of this fact, a semiconductor device is fast turned off in the present invention by providing a separate winding for letting flow a negative polarity drive current into the semiconductor device on the main transformer and by feeding the negative polarity drive current to the semiconductor device from the separate winding.

Further, the semiconductor device can be more surely turned off by providing a current maintaining circuit for maintaining the negative polarity drive current even after the winding voltage has disappeared in order to suppress the tailing current of the semiconductor device.

After the semiconductor device turns off, the voltage which has been induced on each winding of the main transformer disappears. Accordingly, there is no fear that an excessive reverse voltage will be applied to the control electrode of the semiconductor device which has completely turned off. Therefore, it is possible to set the voltage put out from the winding provided on the main transformer which lets flow a negative polarity drive current for a sufficient high value and to obtain a negative polarity drive current which rises fast.

The present invention is widely applicable to a semiconductor device having a control electrode such as a transistor, GTO or MOS FET. Here the control electrode means a base for a transistor and a gate for a GTO or a MOS FET. Each of these semiconductor devices has two main electrodes. They are the collector and the emitter for a transistor, the anode and cathode for a GTO, and the drain and source for a MOS FET.

The objects and features of the present invention will be well understood from the following description of the invention with reference to the accompanying drawings, in which.

Figure 1:
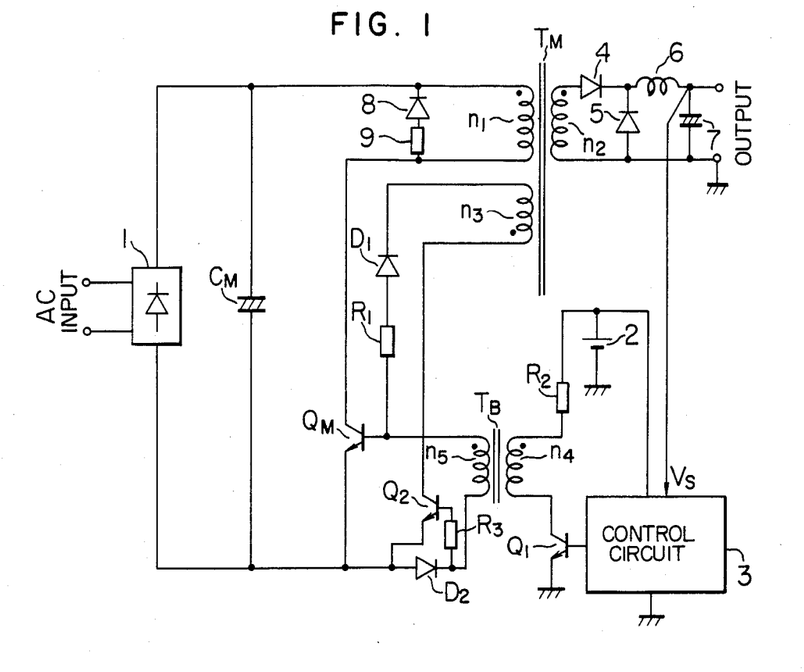
FIG. 1 shows an embodiment of the present invention in which a transistor is used as a switching device.

Now, referring to FIG. 1, there is shown a forward type switching regulator containing one active main switching element in which a transistor is used as a semiconductor device. The main circuit of the switching regulator is composed of a rectifier 1, an input smoothing capacitor $C_M$, a main transformer $T_M$ and a main transistor $Q_M$. The main transformer $T_M$ composes the primary winding $n_1$, the output winding $n_2$ and a winding $n_3$ for feeding a negative polarity base current. The power source 2 supplies an electric power to a control circuit 3 and feeds a positive polarity base current to the main transistor $Q_M$. The control circuit 3 produces a signal for driving the main transistor $Q_M$ from the output voltage detection signal Vs so that the output voltage may be kept constant. Numeral 4 denotes an output rectifying diode. Numeral 5 denotes a diode for returning the current in an output smoothing reactor. Numeral 7 denotes an output smoothihg capacitor. Numerals 8 and 9 denote respectively a diode and a resistor for discharging the exciting current within the main transformer $T_M$ when the main transistor $Q_M$ turns off. $D_1$ is a diode for blocking the exciting current of the main transformer. $R_1$ is a resistor for limiting the negative polarity base current. A semiconductor device with a control electrode $Q_2$, which is a transistor in FIG. 1, serves to block the output current of the winding $n_3$ until the main transistor $Q_M$ is turned off. An auxiliary transformer $T_B$ is used for supplying the current from the power source (2) to the main transistor $Q_M$ as a base current of positive polarity (hereafter referred to as a base drive transformer). $R_2$ is a resistor for limiting the base current of positive polarity. $Q_1$ is a transistor which is switched on and off according to the output of the control circuit 3 to drive the main transistor $Q_M$. $D_2$ is a diode for transforming the exciting current of the transformer $T_B$ which is released when the transistor $Q_1$ turns off into the base current of the transistor $Q_2$. When the base current of positive polarity is supplied, the diode $D_2$ serves to reversely bias the base of the transistor $Q_2$ relative to its emitter by its own forward voltage drop. $R_3$ is a resistor for limiting the base current of the transistor $Q_2$.

As the operation of a forward type switching regulator is well known, description of overall operation will be omitted and only the operation when the main transistor $Q_M$ is switched on or off at the forward type switching regulator constituted in the present embodiment will be hereafter described.

When the base current of the transistor $Q_1$ is fed from the control circuit 3, the transistor $Q_1$ turns on. Because of the voltage with its positive polarity on the illustrated black dot which is induced on each of windings $n_4$ and $n_5$ of the base drive transformer $T_B$, a positive polarity current is fed into the base of the main transistor $Q_M$ to turn it on. When the main transistor $Q_M$ turns on, a current flows through the winding $n_1$, thereby a voltage with its positive polarity on the illustrate black dot is induced on each winding of the main transformer $T_M$. Thus, an output current flows through the winding $n_2$, and at the same time a voltage with its positive polarity on the illustrated black dot is also induced on the winding $n_3$. However, the emitter of the transistor $Q_2$ is biased in the reverse direction relative to its emitter because of the voltage drop across the diode $D_2$ which is caused by the positive polarity base current fed to the main transistor $Q_M$ through the diode $D_2$. Therefore, the transistor $Q_2$ surely remains in the OFF state while the positive polarity base current is being fed to the main transistor $Q_M$. Accordingly, in the ON period of $Q_M$, only the voltage is induced on the winding $n_3$ and a current cannot flow through the winding $n_3$ until the transistor $Q_2$ turns on.

Subsequently, turning off of the main transistor will be described. If the base current fed to the transistor $Q_1$ from the control circuit 3 is interrupted, the transistor $Q_1$ turns off. Due to the exciting current which has flowed through the transformer $T_B$ while the transistor $Q_1$ is ON, a voltage having its positive polarity on the end opposite the illustrated black dot is induced on each of windings $n_4$ and $n_5$. Accordingly, a current from the winding $n_5$ flows through the resistor $R_3$, the base of transistor $Q_2$, the emitter of transistor $Q_2$, the emitter of transistor $Q_M$ and the base of transistor $Q_M$. Thereby, transistor $Q_2$ turns on. At the time when the transistor $Q_2$ turns on, the current of positive polarity is shut off from the base of the main transistor $Q_M$. However, the main transistor $Q_M$ cannot immediately turn off and it remains in the ON state during the storage time. Therefore, the voltage with its positive polarity on the illustrated black dot continues to be induced on each winding of the main transformer $T_M$. Thus, when transistor $Q_2$ turns on, a current from the winding $n_3$ flows through the collector of transistor $Q_2$, the emitter of transistor $Q_2$, the emitter of transistor $Q_M$, the base of transistor $Q_M$ and the resistor $R_1$ to the diode $D_1$. That is to say, a negative polarity current is flowed through the base of the main transistor $Q_M$. The current which flows through the winding $n_3$ due to turning on of the transistor $Q_2$ is expressed by the following equation, neglecting voltage drops across circuit components.

$$I_R = V_{CM} \cdot \frac{n_3}{n_1} \cdot \frac{1}{R_1} \qquad (1)$$

Where $V_{CM}$ is the charged voltage across the capacitor $C_M$, and $n_1$ and $n_3$ denote the numbers of turns of respective windings.

The negative polarity base current of the main transistor $Q_M$ can be arbitrarily determined by choosing the number of turns of winding $n_3$ and the resistance value of the resistor $R_1$ according to equation (1). Thus, it is possible to feed a sufficiently large current of negative polarity to the base of the main transistor $Q_M$.

Owing to this base current of the negative polarity, the turn-off time of the main transistor $Q_M$ is reduced. When the main transistor $Q_M$ has turned off, the exciting current which has flowed through the main transformer $T_M$ is dissipated through the resistor 9 and the diode 8. At this time, a voltage having its positive polarity on the end opposite to the illustrated black dot is induced on each winding of the main transformer $T_M$. The voltage induced on the winding $n_3$ is blocked by the diode $D_1$. Thus, the base current of negative polarity fed to the main transistor $Q_M$ is shut off concurrently with turning off of the main transistor $Q_M$. Therefore, there is no fear that an excessive reverse voltage will be applied to the base electrode of the main transistor $Q_M$ which has already turned off. This means that an excessive reverse voltage will not be applied to the base electrode of the main transistor $Q_M$ even if a sufficiently large output voltage of the winding $n_3$ is chosen. Therefore, it is possible to establish an output voltage of the winding $n_3$ which is sufficiently larger than the reverse breakdown voltage between the base and the emitter of the main transistor $Q_M$. Accordingly, even if the leak inductance of the main transformer $T_M$ and the inductance of wirings, etc. exist, it is possible to let flow a negative polarity base current which rises fast.

Subsequently, when the transistor $Q_1$ turns on and a positive polarity base current is fed to the main transistor $Q_M$, transistor $Q_2$ turns off quickly and surely due to the voltage drop across diode $D_2$.

As described heretofore, the main transistor $Q_M$ is driven by the positive polarity base current which is controlled by the control circuit 3 and by the negative polarity base current which is supplied from the separate winding $n_3$ of the main transformer $T_M$. The control circuit 3 will be hereafter described in detail.

As the control circuit 3, a monolithic integrated circuit (hereafter referred to as IC) which incorporates most functions required for the control circuit of a switching regulator can be used. An example of the control circuit wherein an IC for exclusive use is used will be described referring to FIG. 2. This IC constituted for the pulse width modulation technique incorporates two differential amplifiers $A_1$ and $A_2$, a 5-volt reference power supply REF·REG, an sawtooth waveform voltage generator OSC, a reference voltage supply Eo, a comparator COMP, and independent output-stage transistors $TR_1$ and $TR_2$ for two channels.

Figure 2:
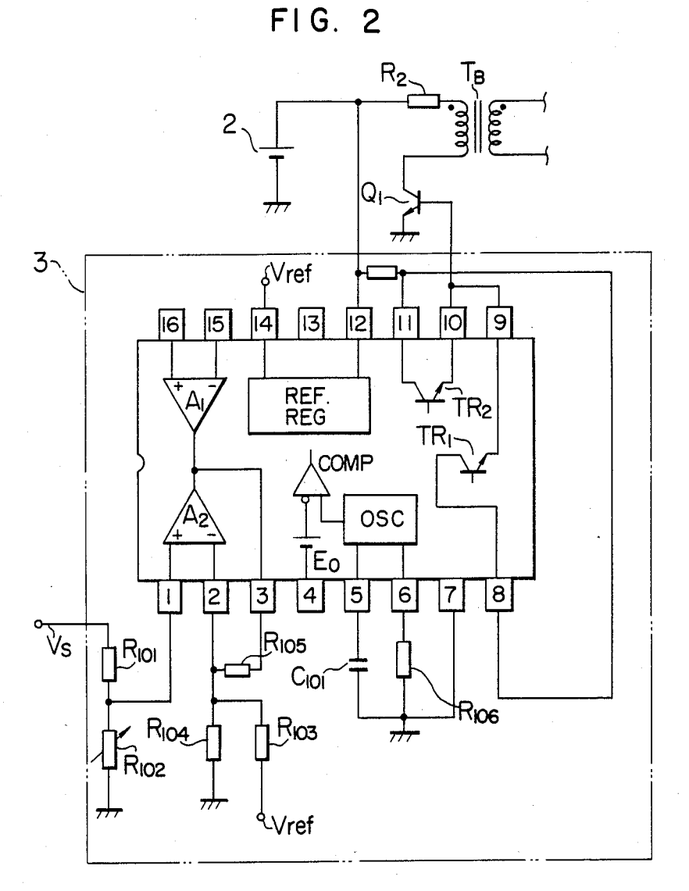
FIG. 2 shows an example of an integrated circuit composing a control circuit of a switching regulator.

In addition, although not illustrated in FIG. 2, the output of the differential amplifier $A_2$ which depends upon the output voltage detection signal Vs and the sawtooth waveform voltage are applied to a comparator, the output of which is applied to a frequency division circuit to control the ON duties of transistors $TR_1$ and $TR_2$. The comparator, which drives transistors $TR_1$ and $TR_2$, compares an output of the differential amplifier $A_2$ with the level of the sawtooth waveform voltage. When the sawtooth waveform voltage level is lower than the level of output of the differential amplifier $A_2$, the comparator generates a high-level signal to turn on the transistors $TR_1$ and $TR_2$. The differential amplifier $A_2$ generates a higher voltage according to a higher output of the switching regulator, consequently the conduction periods of the transistors $TR_1$ and $TR_2$ are shortened. On the other hand, the output from the differential amplifier $A_2$ becomes lower according to the lower output of the switching regulator, and consequently the conduction periods of transistors $TR_1$ and $TR_2$ are made longer. Due to the above described operation, the control circuit 3 has a function of controlling the output voltage from the switching regulator.

In FIG. 2, R101 and R102 are resistors for voltage division. R103 and R104 are resistors of a voltage divider for the reference voltage $V_{ref}$. R105 is a resistor for determining the gain of the differential amplifier $A_2$. Values of resistor R106 and capacitor C101 are chosen so as to determine the oscillation frequency of the oscillator OSC. The operation frequency may be extended as high as 450 kHz.

Pins with numbers 7 and 13 are grounding terminals. A pin with pin number 4 is used for softstarting of the regulator so as to prevent the output voltage of the switching regulator from over-shooting, in which the conduction period of the transistor $Q_M$ is gradually increased thereby rising slowly the output voltage of the regulator after starting thereof, and also may be used for a dead time control which determines the maximum conduction period of the main transistor $Q_M$ so as to prevent a saturation of the main transformer $T_M$.

The other differential amplifier $A_1$ can be used when desiring overcurrent protection function. The overcurrent protection can be accomplished, for instance, by providing a shunt resistor in series with the output circuit of the main circuit and by comparing the voltage drop across the resistor with the reference voltage. That is, the output of the differential amplifier $A_1$ is to be compared with the level of the sawtooth waveform voltage by the comparator COMP. Either a higher one of the output voltages of both the differential amplifiers $A_1$ and $A_2$ is selected to be applied to the comparator COMP.

When an output voltage of the switching regulator is lower than the level at which the overcurrent protection is required, the output of the differential amplifier $A_2$ is selected to be applied to the comparator COMP. When an output voltage of the switching regulator is not less than the level at which the overcurrent protection is required, the output of the differential amplifier $A_1$ is selected to be applied to the comparator COMP. With this operation, the output of the switching regulator is prevented from overcurrent by the output of differential amplifier $A_1$. Thus, the overcurrent protection is accomplished.

As the transistor $Q_1$ which switches on and off the transformer $T_B$ for driving the main transistor $Q_M$ as shown in FIG. 1, the transistors $TR_1$ and $TR_2$ incorporated in the IC can be used.

The control circuit 3 thus constituted can effect optimum pulse width modulation by detecting the change of the output voltage. As a result, a stable output can be obtained.

According to the present embodiment as heretofore described, the negative polarity base current for turning off the main transistor $Q_M$ can be obtained from the main circuit. Accordingly, the driving power source 2 is only demanded to feed the power enough to turn on the main transistor $Q_M$. The requisite power of the driving power source 2 is approximately half that of the conventional system wherein the negative polarity base current of the main transistor $Q_M$ is obtained from the exciting current stored in the transformer $T_B$. Hence, it is a matter of course that the sizes of the transformer $T_B$ and the transistor $Q_1$ can be reduced.

Further, according to the present embodiment, there is no fear that an excessive reverse voltage will be applied to the base electrode of the main transistor $Q_M$ which has already turned off. Accordingly, since a sufficiently high output voltage can be selected for the winding $n_3$, a negative polarity base current of the main transistor $Q_M$ which rises faster can be obtained. In addition, since a current having a large peak value can be obtained by appropriately choosing values of $R_1$ and $n_3$ according to equation (1), the turning-off time of the main transistor $Q_M$ can be largely reduced. Accordingly to an example of an experiment, the turning off time of the main transistor $Q_M$ is 1.5 microseconds in the conventional system and it has been reduced to 0.3 microseconds in accordance with the present embodiment.

Figure 3:
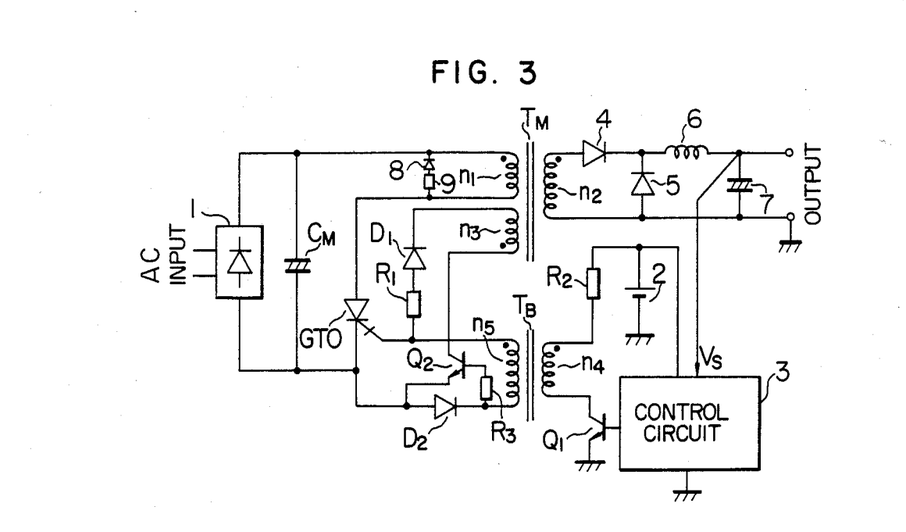
FIG. 3 shows an embodiment of the present invention in which a gate turn-off thyristor is used as a switching device.

FIG. 3 shows an embodiment of the present invention wherein a GTO is used as a switching device. Its constitution is the same as that shown in FIG. 1 except that a GTO is used instead of the main transistor $Q_M$. Components in the circuit operate in the same way as those shown in FIG. 1.

As is generally known, an off-gate current having a large peak value is momentarily required to turn off a GTO. This has resulted in increased power of the driving power source 2 and a more complicated gate circuit. For fast turning off a GTO, it is indispensable to supply an off-gate current which fast rises and has a sufficiently large peak value.

According to this embodiment, the off-gate current of the GTO is obtained from the main circuit. Accordingly, it is possible to lower the requisite power of the driving power source 2 and to reduce the size of the circuit and simplify it. In addition, as described referring to FIG. 1, the output voltage from the winding $n_3$ is inversed concurrently with turning off of the GTO. Hence, there is no fear that an excessive reverse voltage will be applied to the gate electrode of the GTO and it is possible to select the output voltage of the winding $n_3$ which exceeds the reverse breakdown voltage between the gate and the cathode of the GTO. This means that it is permitted to let flow an off-gate current which has a large peak value and rises fast for fast turning off the GTO.

Figure 4:
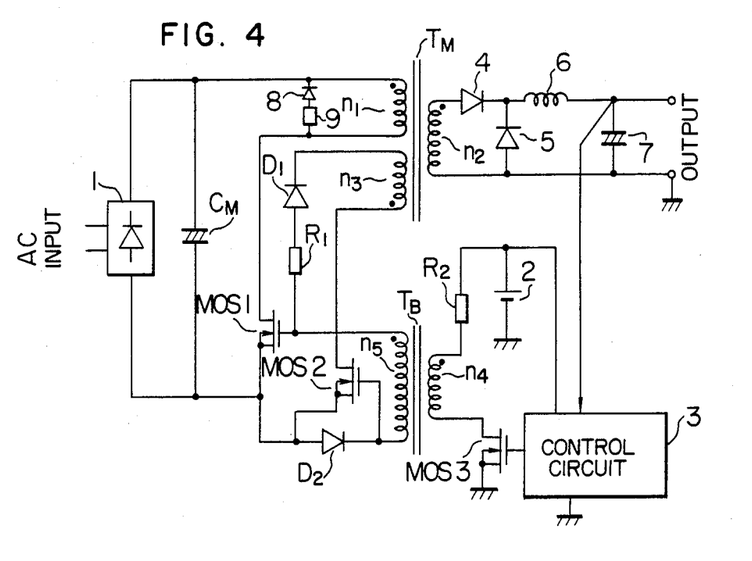
FIG. 4 shows an embodiment of the present invention in which a MOS FET is used as a switching device.

FIG. 4 shows an embodiment of the present invention wherein a MOS FET is used as a switching element. The illustrated MOS FET is an N-channel MOS FET, which turns on when the gate electrode is biased with positive polarity relative to the source electrode and turns off when the bias voltage is removed. In this embodiment, the transistors $Q_M$, $Q_2$ and $Q_1$ shown in FIG. 1 are respectively replaced by MOS1, MOS2 and MOS3. The circuit operation is similar as that of the circuit shown in FIG. 1 or FIG. 3.

The MOS FET has excellent features such as a faster switching speed and lower gate driving power as compared with a transistor or a GTO.

The switching speed of a MOS FET largely depends upon the equivalent capacitance existing within the MOS FET, and the switching speed is determined by the time periods required for the equivalent capacitance existing between the gate electrode and the source electrode (hereafter referred to as an input capacitance) to be charged and discharged. Further, the driving power for a MOS FET is also determined by the energy required for charging and discharging the input capacitance.

Recently, the input capacitance tends to be increased with the advance of increase in the capacity of a MOS FET.

For fully utilizing features of the MOS FET such as the fast switching characteristics and low driving power, therefore, a gate circuit which is able to feed a gate current of a large peak value with a low loss is demanded.

According to the present embodiment, only the power for charging the input capacitance is derived from the driving power source 2 and the power for discharging the input capacitance is derived from the main circuit. Accordingly, even if the input capacitance of the MOS FET is increased, the power of the driving power source 2 is not largely increased. Further, as described before referring to FIG. 1 and FIG. 3, the negative polarity control current for turning off the main switching device can be obtained from the main circuit. Accordingly also the power for discharging the input capacitance of the MOS FET thereby to turn on the MOS FET can be derived from the main circuit. Consequently, a current having a large peak value for discharging the input capacitance can be obtained easily. Thus, it is possible to discharge the input capacitance in a short time. Even if the input capacitance of a MOS FET is increased, therefore, the fast turning off characteristic is not lost.

Figure 5:
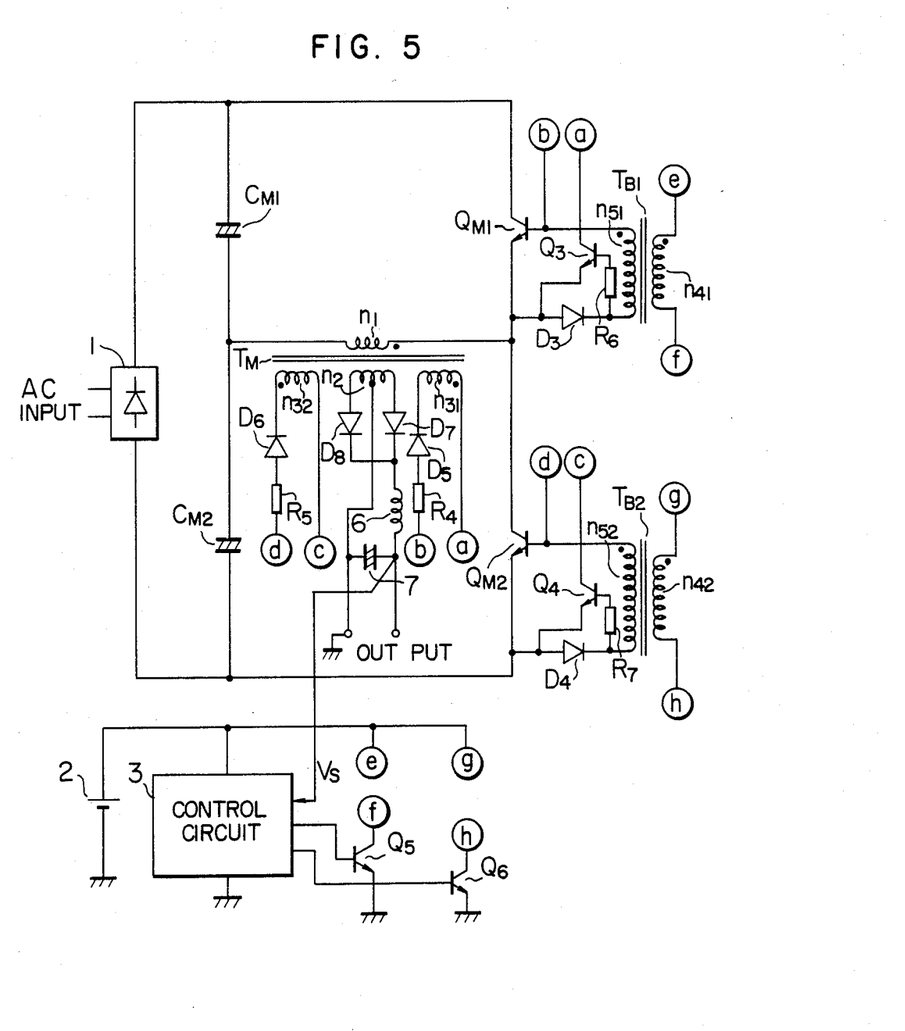
FIG. 5 shows an embodiment of the present invention which has been applied to an inverter.

FIG. 5 shows an embodiment wherein the present invention has been applied to an half bridge inverter. In FIG. 5, $C_{M1}$ and $C_{M2}$ are input smoothing capacitors. $Q_{M1}$ and $Q_{M2}$ are main switching transistors. $T_{B1}$ and $T_{B2}$ are base drive transformers respectively for driving the main switching transistors $Q_{M1}$ and $Q_{M2}$. Marks $n_{41}$ and $n_{51}$ are respectively primary and secondary windings of the base drive transformer $T_{B1}$. Marks $n_{42}$ and $n_{52}$ are respectively primary and secondary windings of the base drive transformer $T_{B2}$. $T_M$ is a main transformer. Marks $n_1$, $n_2$, $n_{31}$ and $n_{32}$ are windings provided on the main transformer $T_M$. $D_5$ and $D_6$ are diodes for rectifying the outputs of the windings $n_{31}$ and $n_{32}$ respectively. $R_4$ and $R_5$ are resistors for limiting the negative polarity base current of the main switching transistors $Q_{M1}$ and $Q_{M2}$ respectively. $Q_3$ and $Q_4$ are transistors for switching the negative polarity base current of the main switching transistors $Q_{M1}$ and $Q_{M2}$ respectively. $D_3$ and $D_4$ are diodes for transforming the exciting current within the base driving transformers $T_{B1}$ and $T_{B2}$ respectively into the base current of transistors $Q_3$ and $Q_4$ respectively when the exciting current is released. $R_6$ and $R_7$ are resistors for limiting the base current of the transistors $Q_3$ and $Q_4$ respectively. $Q_5$ and $Q_6$ are transistors for driving the main transistors $Q_{M1}$ and $Q_{M2}$ respectively. $D_7$ and $D_8$ are diodes for rectifying the output.

Since an operation of the half bridge inverter circuit is widely known, description for the inverter operation will be omitted. If the base current of transistor $Q_5$ is supplied from the control circuit 3, the transistor $Q_5$ turns on. Thereby a positive polarity base current of the main transistor $Q_{M1}$ is fed from the driving power source 2 via the base drive transformer $T_{B1}$ to turn on the main transistor $Q_{M1}$. Due to conduction of the main transistor $Q_{M1}$, a current from the capacitor $C_{M1}$ flows through the winding $n_1$ of the main transformer $T_M$. Thus, the winding $n_2$ feeds power to the load and the voltage having the positive polarity on the illustrated black dot is induced on each of windings $n_{31}$ and $n_{32}$. Since the current in the winding $n_{31}$ is blocked by the transistor $Q_5$ and the current in the winding $n_{32}$ is blocked by the diode $D_6$, only the voltage is induced on each winding and no current flows.

When the transistor $Q_5$ turns off due to interruption of the base current of the transistor $Q_5$ fed from the control circuit 3, the exciting current which has been stored within the transformer $T_{B1}$ during the ON period of the transistor $Q_5$ is released through resistor $R_6$, the base of the transistor $Q_3$, the emitter of the transistor $Q_3$, the emitter of the main transistor $Q_{M1}$ and the base of the main transistor $Q_{M1}$, the transistor $Q_3$ turning on. Immediately after the transistor $Q_3$ has turned on, the voltage having positive polarity on the illustrated black dot remains to be induced on each winding of the main transformer $T_M$ during the storage time of the main transistor $Q_{M1}$. And a current from the winding $n_{31}$ flows through the collector of the transistor $Q_3$, the emitter of the transistor $Q_3$, the emitter of the main transistor $Q_{M1}$ to the base of the main transistor $Q_{M1}$ to fast turn off the main transistor $Q_{M1}$. When the main transistor $Q_{M1}$ has turned off, the voltage having its positive polarity on the end opposite the illustrated black dot is induced on each winding of the main transformer $T_M$. However, a current caused by the voltage on winding $n_{31}$ is blocked by the diode $D_5$ and a current caused by the voltage on winding $n_{32}$ is blocked by the transistor $Q_4$. The main transistor $Q_{M2}$ turns on and fast turns off in the same way as $Q_{M1}$.

In this embodiment, the similar effect as the circuit shown in FIG. 1 can be obtained.

Further, when the GTO or MOS FET as shown in FIG. 3 or FIG. 4 is used in the half bridge invertor circuit, the present invention can be applied in the same way.

It is obvious from the circuits as shown in FIG. 1 to FIG. 5 that the present embodiment can also be applied to a push-pull inverter, a bridge invertor, a flyback convertor having one active main switching element and so on.

According to the embodiment, it becomes possible to feed the negative polarity drive current which fast rises and has a large peak value from the main circuit to a semiconductor device. Therefore, it is possible to turn off a semiconductor device five times faster as compared with the conventional circuit and to achieve high frequency operation by using a simple drive circuit. Further, the power requisite of the power source for the driving circuit of a semiconductor device can be reduced to half or less that of the conventional circuit. As a result, a small sized, highly efficient power converting appatatus can be obtained.

Figure 6:
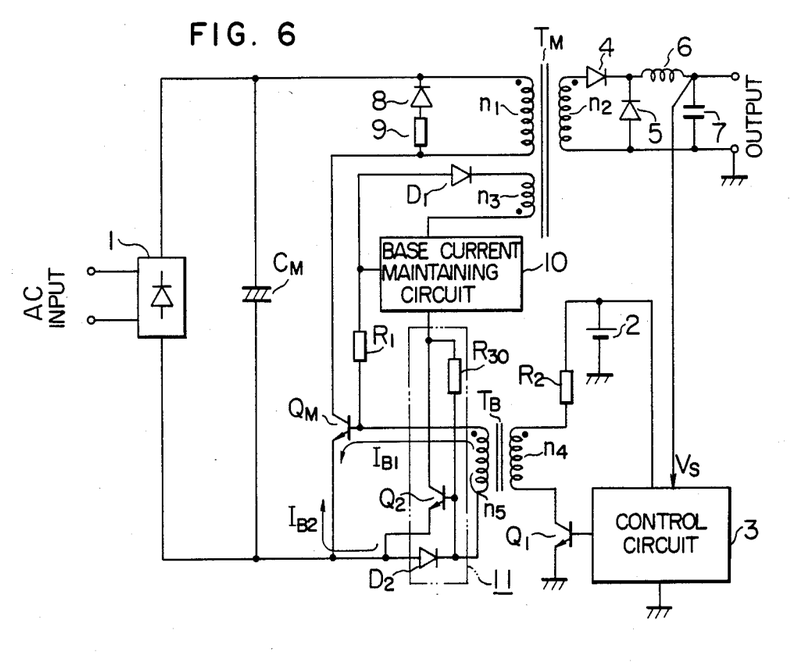
FIG. 6 shows another embodiment of the present invention in which a transistor is used as a switching device.

An embodiment shown in FIG. 6 has the same constitution as the embodiment shown in FIG. 6 except that a negative polarity base current maintaining circuit 10 is added and the switch mechanism 11 including transistor $Q_2$ is improved. The constitution and function of the base current maintaining circuit 10 will be described later. In the switch mechanism 11, resistor $R_{30}$ is inserted between the base and collector of the transistor $Q_2$, and the base is directly connected to one end of the winding $n_5$.

When the control circuit 3 feeds the base current to the transistor $Q_1$ to turn it on, the voltage having the positive polarity on the illustrated black dot is induced on each of windings $n_4$ and $n_5$ of the base driving transformer $T_B$. Thereby the positive polarity base current $I_{B1}$ is fed to the main transistor $Q_M$ to turn it on. Due to turning on of the main transistor $Q_M$, a current flows through the winding $n_1$, thereby the voltage having its positive polarity on the illustrated black dot is induced on each winding of the main transformer $T_M$ and the current flows through the winding $n_2$. At the same time, the voltage having its positive polarity on the illustrated black dot is induced on the winding $n_3$. However, transistor $Q_2$ remains in the OFF state due to the reverse bias of the base electrode, which is supplied with a voltage drop across the diode $D_2$ by the current $I_{B1}$. While the main transistor $Q_M$ is ON, therefore, the voltage on the winding $n_3$ lets flow a slight current through a loop including resistor $R_{30}$, winding $n_5$, resistor $R_1$ and diode $D_1$.

Subsequently, turning off of the main transistor $Q_M$ will be described. When the base current of the transistor $Q_1$ fed from the control circuit 3 is interrupted, the transistor $Q_1$ turns off. Due to turning off of the transistor $Q_1$, the reverse bias due to a voltage drop across the diode $D_2$ is eliminated. At the same time, the voltage having its positive polarity on the end opposite the illustrated black dot is produced on each of windings $n_4$ and $n_5$ by the exciting current. The base current of the transistor $Q_2$ flows from the winding $n_5$. In addition, the current from the winding $n_3$ which has flowed through the resistor $R_{30}$, the winding $n_5$, the resistor $R_1$ and the diode $D_1$ flows from the resistor $R_{30}$ through the base and emitter of the transistor $Q_2$, the base and emitter of the transistor $Q_M$ and the resistor $R_1$ to the diode $D_1$. That is, the current from the winding $n_3$ which has flowed through the resistor $R_{30}$ is also applied to the base of the transistor $Q_2$. Therefore, the transistor $Q_2$ turns on surely. At the time when transistor $Q_2$ has turned on, the positive polarity base current of the main transistor $Q_M$ is interrupted. However, the main transistor $Q_M$ cannot turn off immediately and remains in the ON state during its storage time period. Accordingly, the voltage having its positive polarity on the illustrated black dot remains to be induced on each winding of the main transformer $T_M$.

Thus, due to conduction of transistor $Q_2$, a reverse base current $I_{B2}$ from the winding $n_3$ flows through the collector and emitter of the transistor $Q_2$ to the main transistor $Q_M$. This reverse base current $I_{B2}$ is identical with the current $I_R$ which has been expressed by equation (1).

Owing to this negative polarity base current $I_{B2}$, the time period required for the main transistor $Q_M$ to turn off is reduced. When the main transistor $Q_M$ has turned off, the exciting current which has flowed through the main transformer $T_M$ is dissipated through the resistor 9 and diode 8. At this time, the voltage having its positive polarity on the end opposite the illustrated black dot is produced on each winding of the main transformer $T_M$. The diode $D_1$ blockes the positive base current fed to the main transistor $Q_M$, which current is caused by the voltage induced on the winding $n_3$. Since the negative polarity base current fed to the main transistor $Q_M$ is shut off at the instant the main transistor $Q_M$ turns off, there is no fear that an excessive reverse voltage will be applied to the base electrode of the main transistor $Q_M$ which has already turned off. This means that an excessive reverse voltage will not be applied to the base electrode of the main transistor $Q_M$ even if a sufficiently high output voltage is chosen for the winding $n_3$.

Therefore, it is permitted to select the output voltage of the winding $n_3$ which is sufficiently larger than the reverse breakdown voltage between the base and emitter of the main transistor $Q_M$. Accordingly, it is possible to let flow a base current of negative polarity which rises fast irrespective of the leak inductance within the main transformer $T_M$ and wiring inductance.

Subsequently, if the transistor $Q_1$ turns on and a positive polarity base current is fed to the main transistor $Q_M$, transistor $Q_2$ turns off rapidly and quickly due to the voltage drop across the diode $D_2$.

The circuit for maintaining the base current of negative polarity 10 will be described hereafter. In the circuit shown in FIG. 6, the base current of negative polarity is shut off the instant the main transistor $Q_M$ turns off. At this time, however, the collector current $I_C$ of the main transistor $Q_M$ is not zero strictly speaking due to the effect of carriers which remain near the base electrode. This slight current is generally referred to as a tail current. Since the tail current flows when the collector-emitter voltage $V_{CE}$ of the main transistor $Q_M$ is high, it becomes a primary cause of switching loss. As the drive frequency becomes higher, the tail current affects the loss more seriously.

Figure 7:
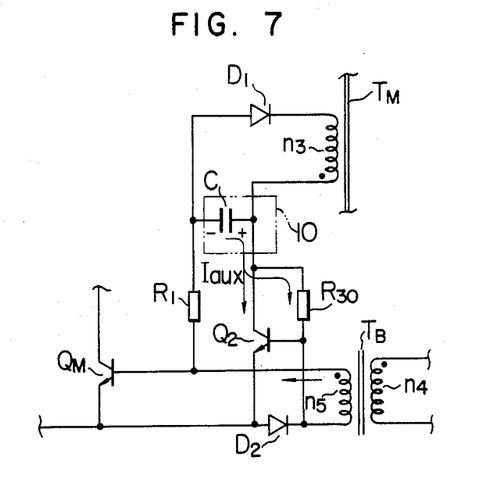
FIG. 7 and FIG. 8 illustrate the negative polarity base current connection circuit.
Figure 8:
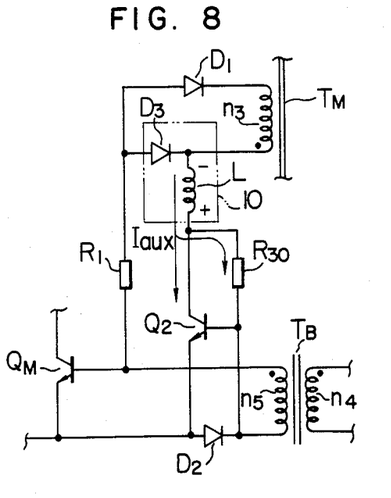
Figure 9:
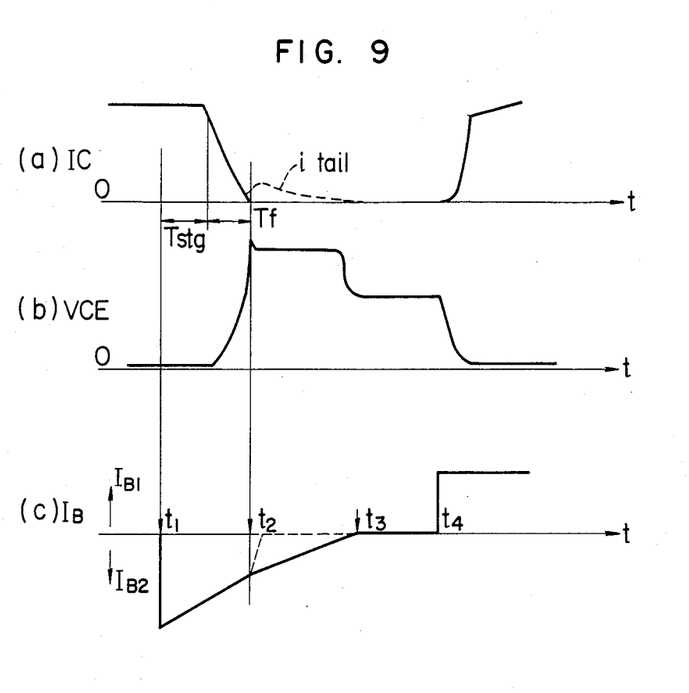
FIG. 9 illustrates the current waveform and voltage waveform for explaining the embodiment as shown in FIG. 6.

The circuit for maintaining the base current of negative polarity 10 according to the present embodiment is used for eliminating this drawback. The negative polarity base current maintaining circuit 10 may be practically constituted as shown in FIG. 7 or FIG. 8. In FIG. 7, a capacitor C is placed in parallel with a series circuit composed of the winding $n_3$ and the diode $D_1$. When the main transistor $Q_M$ turns off, the charge stored in the capacitor C with illustrated polarity signs is released to feed a current $I_{aux}$. In FIG. 8, a reactor L and a diode $D_3$ for current return are placed in series with the winding $n_3$. When the main transistor $Q_M$ turns off, the energy stored in the reactor L is released to feed a current $I_{aux}$. Referring to FIG. 9, details of the operation will be described. If the base current of negative polarity $I_{B2}$ is supplied at time $t_1$, the main transistor $Q_M$ turns off after the storage time $T_{stg}$ and the fall time $T_f$. Unless the negative polarity base current maintaining circuit 10 is not placed, the negative polarity base current $I_{B2}$ decays as illustrated by a broken line. Accordingly, the collector current $I_C$ represents the tail current $i_{tail}$ as illustrated by a broken line. This tail current also includes a current for charging a vacant layer produced between the base and emitter. At this time, the collector to emitter voltage $V_{CE}$ of the main transistor $Q_M$ is raised to the sum of the input charging voltage $V_{CM}$ and the voltage drop across the resistor 9 for releasing the exciting current. Thus, the heat loss between the collector and emitter of the main transistor $Q_M$ becomes a principal cause of thermal runaway in the transistor and lowers efficiency.

According to the present embodiment, it is possible to feed the current $I_{aux}$ from the negative polarity base current maintaining circuit 10 after the voltage polarity on the winding $n_3$ is inversed due to turning off of the main transistor $Q_M$. As a result, the tail current can be suppressed. The illustrated solid line show the driving waveform according to the present embodiment. The period during which the current $I_{aux}$ flows are determined by the time constant, which is $C \cdot R_1$ in the circuit shown in FIG. 7 and $L/R_1$ in the circuit shown in FIG. 8. Further, the design which limits the energy stored in the capacitor C and the reactor L to a small amount is possible since the tail current itself is not large.

The following table shows the switching loss when the main transistor $Q_M$ turns on in a forward type switching regulator containing one active main switching element which is designed under the condition that the input is 100V AC and the output is 5V, 10A.

TABLE

| Input condition | Output condition | Switching loss due to turning off (W) | | Ambient temperature |
| --- | --- | --- | --- | --- |
| | | Circuit A | Circuit B | |
| 100V AC | 5V, 2A DC | 0.2 | 0.7 | 20° C. |
| | 5V, 10A DC | 1.0 | 3.0 | 20° C. |
| | 5V, 10A | 1.1 | 5.4 | 60° C. |

TABLE-continued

| Input condition | Output condition | Switching loss due to turning off (W) | | Ambient temperature |
| --- | --- | --- | --- | --- |
| | | Circuit A | Circuit B | |
| | DC | | | |

The circuit A is the circuit shown in FIG. 7 wherein $C=0.022$ $\mu F$ and $R_1=50$ $\Omega$. For the circuit B, $C=0$. Both circuits were driven at a frequency of 80 kHz for comparing the switching loss. For the main transistor $Q_M$, a bipolar transistor 2SC 2613 of Hitachi Ltd. was used.

The effect owing to maintaining the negative polarity base current according to the present embodiment is clearly visible from the above table. Thus, it has become possible to drive the main transistor $Q_M$ at a high frequency.

Without the capacitor C, the ratio of loss to output is increased, resulting in poor efficiency. In addition, the high frequency drive is difficult because of the shape of a radiator fin.

As heretofore described, the negative polarity base current maintaining circuit 10 reduces a switching loss and makes possible to drive a transistor at a high frequency.

Further, according to the present embodiment, the negative polarity base current for turning off the main transistor $Q_M$ can be obtained from the main circuit side. Accordingly, the driving power source 2 is only demanded to feed the power enough to turn on the main transistor $Q_M$. The requisite power of the driving power source 2 is approximately half that of the conventional system wherein the negative polarity base current of the main transistor $Q_M$ is obtained from the exciting current stored in the transformer $T_B$. Hence, it is a matter of course that the sizes of the transformer $T_B$ and the transistor $Q_1$ can be reduced, largely serving to reduce the size and power consumption of a regulator.

Further, according to the present embodiment, there is no fear that an excessive reverse voltage will be applied to the base electrode of the main transistor $Q_M$ which has already turned off. Accordingly, since a sufficiently high output voltage can be selected for the winding $n_3$, a negative polarity base current of the main transistor $Q_M$ which rises faster can be obtained. In addition, since a current having a large peak value can be obtained by appropriately choosing values of the resistor $R_1$ and the winding $n_3$ according to equation (1), the turning-off time of the main transistor $Q_M$ can be largely reduced. According to an example of an experiment, the turning off time of the main transistor $Q_M$ is 1.5 microseconds in the conventional system and it has been reduced to 0.3 microseconds in accordance with the present embodiment.

Figure 10:
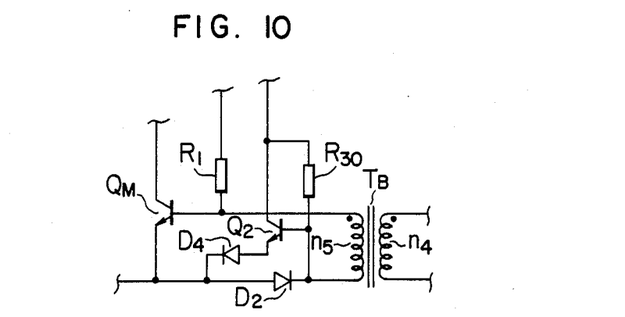
FIG. 10 illustrates an improved circuit for the embodiment as shown in FIG. 6.

FIG. 10 shows a modification of the embodiment shown in FIG. 6. The voltage across the winding $n_5$ of the transformer $T_B$ while the positive polarity base current $I_{B1}$ is flowing is equal to the sum of the voltage drop between the base and emitter of the main transistor $Q_M$ and the forward voltage drop across the diode $D_2$. In FIG. 10, a diode $D_4$ is placed in series with the emitter of the transistor $Q_2$ so that the voltage across the winding $n_5$ after its polarity inversion may be nearly equal to the above described sum. If the positive voltage across the winding is thus equal to the negative voltage, the transformer $T_B$ can be reset easily.

Figure 11:
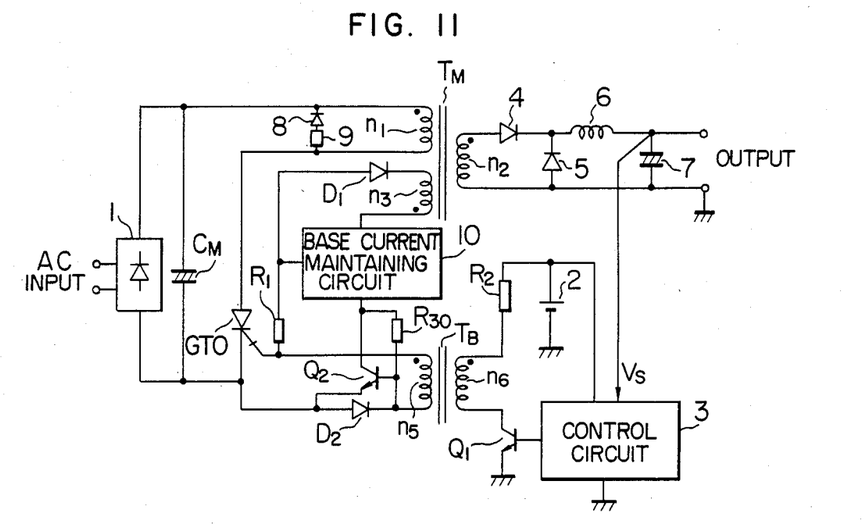
FIG. 11 shows another embodiment of the present invention in which a gate turn-off thyristor is used as a switching device.

FIG. 11 shows an embodiment wherein a gate turn-off thyristor (GTO) is used as a switching device. Components in the circuit operate in the same way as those shown in FIG. 6. As is generally known, an off-gate current having a large peak value is momentarily required to turn off a GTO. This has resulted in increased power of the driving power source 2 and a more complicated gate circuit. For fast turning off a GTO, it is indispensable to supply an off-gate current which fast rises and has a sufficiently large peak value.

According to this embodiment, the off-gate current of the GTO is obtained from the main circuit. Accordingly, it is possible to lower the requisite power of the driving power source 2 and to reduce the size of the circuit and simplify it. In addition, as described referring to FIG. 6, the output voltage from the winding $n_3$ is inversed concurrently with turning off of the GTO. Hence, there is no fear that an excessive reverse voltage will be applied to the gate electrode of the GTO and it is possible to select the output voltage of the winding $n_3$ which exceeds the reverse breakdown voltage between the gate and the cathode of the GTO. This means that it is permitted to let flow an off-gate current which has a large peak value and rises fast for fast turning off the GTO.

Figure 12:
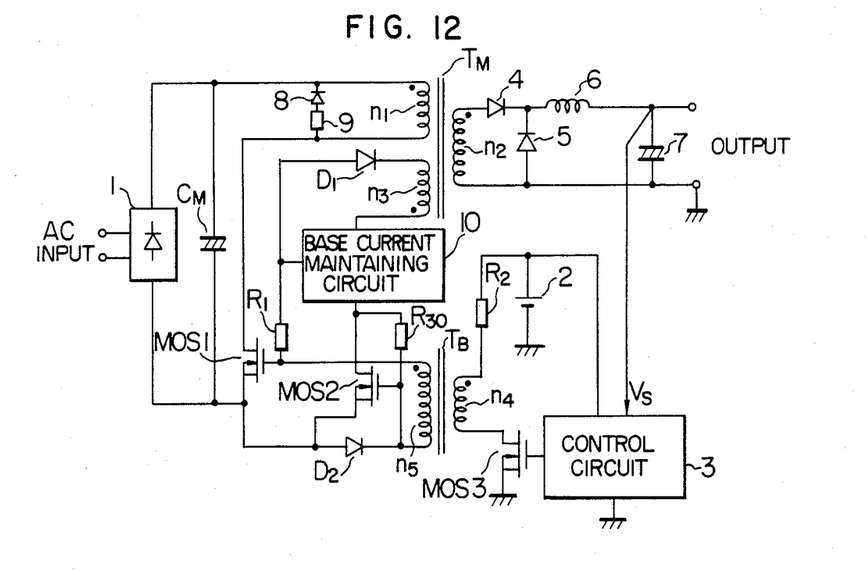
FIG. 12 shows another embodiment of the present invention in which a MOS FET is used as a switching device.

FIG. 12 shows an embodiment wherein a MOS FET is used as a switching element. The illustrated MOS FET is an N-channel MOS FET, which turns on when the gate electrode is biased with positive polarity relative to the source electrode and turns off when the bias voltage is removed. In this embodiment, the main transistor $Q_M$ shown in FIG. 6 is replaced by MOS1 and transistors $Q_1$ and $Q_2$ are replaced by MOS2 and MOS3 respectively. The circuit operates in the same way as that shown in FIG. 6 or FIG. 11.

According to the present embodiment, since the negative polarity gate drive current can be maintained, a gate electrode of the MOS FET can be biased by a negative voltage relative to the source electrode. Consequently, the off state of the MOS FET is surely maintained.

Figure 13:
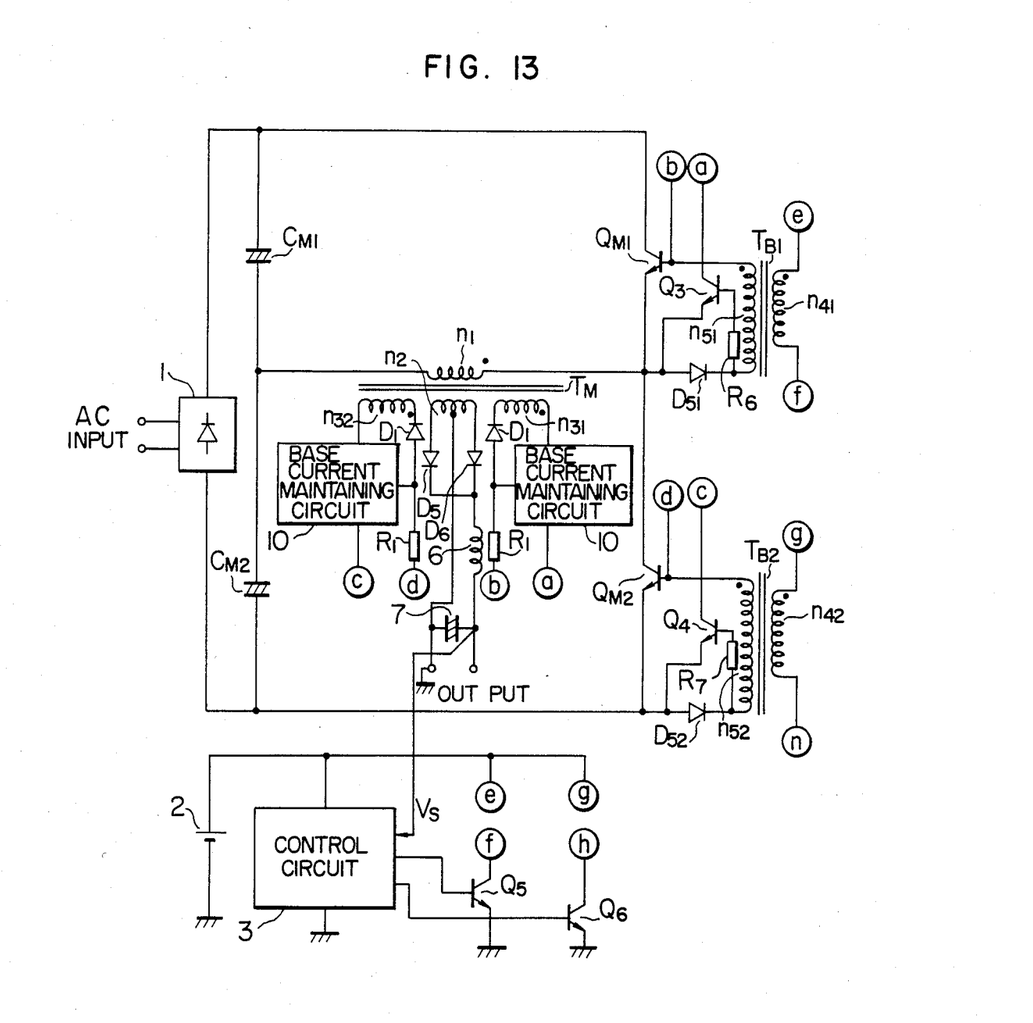
FIG. 13 shows another embodiment of the present invention which has been applied to an inverter.
Figure 15:
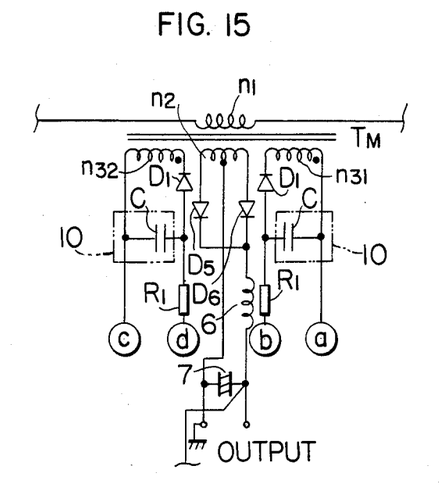
FIGS. 15 and 16 show embodiments for forming the base current maintaining circuits 10 of FIG. 13.
Figure 16:
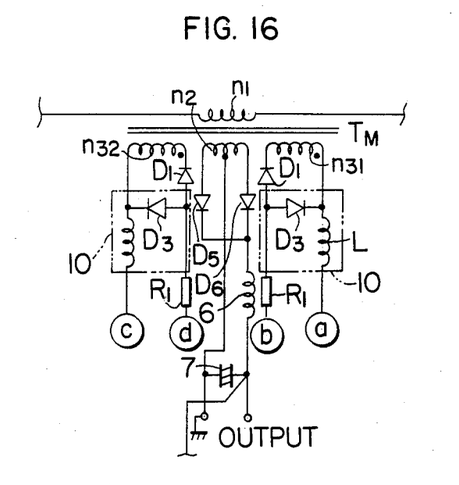

The FIG. 13 embodiment is obtained by adding the base current maintaining circuit to the embodiment shown in FIG. 5. Detailed connections into FIG. 13 of two embodiments of base current maintaining circuits discussed earlier with regard to FIGS. 7 and 8 are illustrated in FIGS. 15 and 16. As seen in FIG. 15, the base current maintaining circuit 10 can be formed by a capacitor C coupling the anode of the diodes $D_1$ with ends of the tertiary coils $n_{31}$ and $n_{32}$ opposite to which the cathodes of the diodes $D_1$ are coupled. Alternatively, the base current maintaining circuits 10 can be formed as shown in FIG. 16 with reactors L and diodes $D_3$. At this time, similarly to the foregoing embodiments, the negative polarity base current maintaining circuit 10 feeds a current and a negative polarity base current continues to flow through the base and emitter of the main transistor $Q_{M1}$. For another main transistor $Q_{M2}$, components operate in the same way. As a result, the output of the invertor is obtained.

In this embodiment, the similar effect as the circuit shown in FIG. 6 can be obtained. Further, when the previously illustrated GTO or MOS FET is used in the half bridge inverter, the present invention can be applied in the same way.

It is obvious from the circuits as shown in FIG. 6 to FIG. 13 that the present embodiment can also be applied to a push-pull inverters, a bridge inverters, a flyback convertor having one active main switching element and so on.

Figure 14:
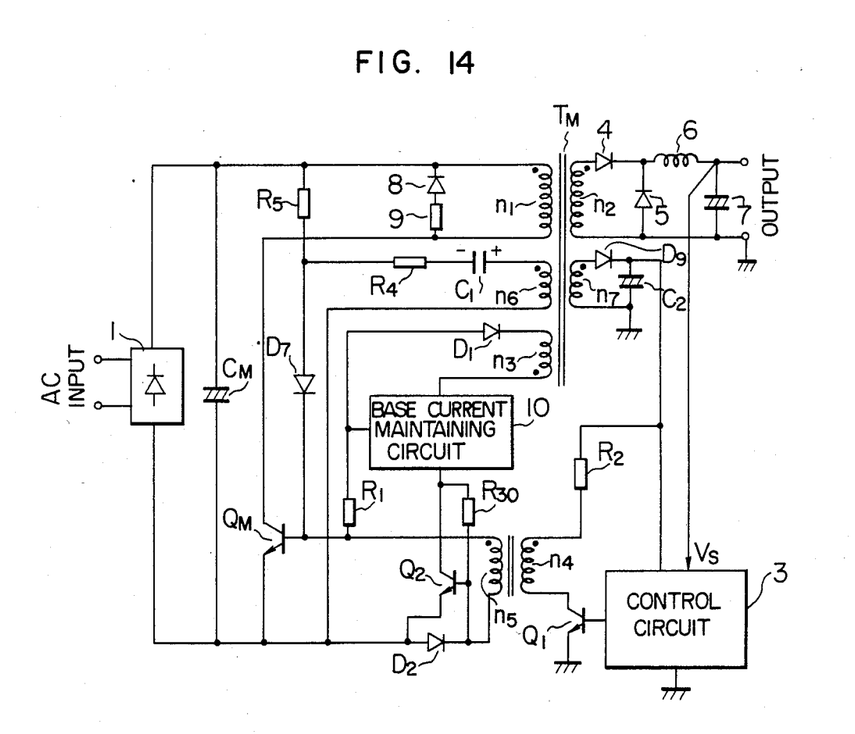
FIG. 14 shows another embodiment of the present invention in which a feedback winding for selfexcited oscillation is added.

FIG. 14 shows an embodiment wherein the present invention is applied to a self-excited switching power supply. As is generally known, the self-excited oscillation is generated by a circuit which is composed of a feedback winding $n_6$ on the main transformer $T_M$, a capacitor $C_1$, a high resistance resistor $R_5$ and a base current limiting resistor $R_4$. $D_7$ is a diode for blocking the exciting current of the main transformer $T_M$. The diode $D_7$ is important for stabilizing the self-excited oscillation. At the time of starting the switching power supply apparatus in this embodiment, the voltage which is induced on a winding $n_7$ of a main transformer $T_M$ due to self-excited oscillation through the winding $n_6$ is transformed into the drive power source for a control circuit 3 via a rectify diode $D_9$ and a smoothing capacitor $C_2$. After starting, a winding $n_1$ of the main transformer $T_M$ induces the voltage on the winding $n_7$ operate the above described drive power source.

At the time of starting the switching power supply apparatus according to the present embodiment, the turning off time of the main transistor $Q_M$ during self-excited oscillation is controlled by the positive feedback current through the winding $n_6$ which is determined by the time constant $C_1 \cdot R_4$ and is not affected by the storage time of the main transistor $Q_M$. The reason is as follows. While the voltage on the capacitor $C_2$ is not sufficiently raised after self excitation has started, the control circuit 3 does not operate. Accordingly, the voltage is not applied to the winding of the semiconductor device drive transformer $T_B$ and the positive feedback current from the winding $n_3$ is able to flow through a resistor $R_{30}$ into the base of the transistor $Q_2$. In this way, the transistor $Q_2$ turns on and feeds a reverse base current to the main transistor $Q_M$. Therefore, even in the period of self-excited oscillation, the turning off time of the main transistor $Q_M$ is reduced, resulting in stable operation.

Subsequently, when a drive signal is issued from the control circuit 3 because of raised voltage on the capacitor $C_2$, the transformer $T_B$ feeds a base drive current to the main transistor $Q_M$ to start the switching power supply apparatus and supply power to the output side.

In this embodiment, the drive signal frequency is chosen to be sufficiently higher than the self-excited oscillation frequency. After the main transistor $Q_M$ has begun to turn on and off due to the drive signal from the control circuit 3, the capacitor $C_1$ is charged in the direction opposite the illustrated polarity with a period which is shorter than the time constant of $(R_5+R_4)\cdot C_1$. As a result, the current flowing through the high resistance value $R_5$ is always absorbed into the capacitor $C_1$ via the resistor $R_4$ and is not able to be a base current of the main transistor $Q_M$. That is to say, after the switching power supply has been started, the self-excited oscillation automatically stops and separately-excited operation is carried out like the foregoing embodiments.

In a self-excited oscillation circuit wherein the inverse base current of a switching transistor is not fed, the storage time of a transistor largely varies because of the nonuniformity among transistor lots and the temperature variance. For instance, even if the ON period of a transistor is designed to be 1 to 2 microseconds, the ON period varies even to ten times or more as long as the design value due to the storage time when the transistor is mounted. Therefore, if a transistor with a long storage time is used as the main transistor $Q_M$, an excessive voltage might be applied to the control circuit at a high temperature. On the contrary, for a main transistor $Q_M$ with a short storage time, the control circuit might not be started because of insufficient voltage under the condition of a low temperature and low input voltage. In the present embodiment, not only when the main transistor $Q_M$ operates by the drive signal from the control circuit 3 but also during self-excited oscillation, the main transistor $Q_M$ is able to turn off by the voltage induced on the winding $n_3$. Thus, the stable drive power can be obtained.

According to the present invention, it becomes possible to feed a negative polarity drive current which fast rises and has a large peak value from the main circuit to a semiconductor device. Therefore, it is possible to turn off a semiconductor device five times faster as compared with the conventional circuit. In addition, it is possible to achieve high frequency operation by using a simple drive circuit owing to the lower switching loss. Further, the power requisite of the power source for the driving circuit of a semiconductor device can be reduced to half or less that of the conventional circuit. As a result, a small sized, highly efficient power converting apparatus can be obtained.

We claim:

1. A switching power supply apparatus comprising a main semiconductor device having a control electrode and a semiconductor device drive circuit, a first main electrode of said main semiconductor device being connected to one electrode of a DC power source via a primary winding of a main transformer, a second main electrode of said main semiconductor device being connected to the other electrode of said DC power source, said control electrode of said main semiconductor device being connected to said second main electrode via a secondary winding of a semiconductor device drive transformer, a drive current from said semiconductor device drive circuit being fed to said main semiconductor device via a primary winding of said semiconductor device drive transformer, said main semiconductor device being turned on or off according to feeding or interruption of said drive current for producing an output on a secondary winding of said main transformer;
   a first diode inserted between one end of said secondary winding of said semiconductor device drive transformer and said second main electrode of said main semiconductor device;
   a tertiary winding provided on said main transformer having one end coupled to said control electrode of said main semiconductor device via a second diode and the other end coupled to an anode of said first diode via an auxiliary semiconductor device having a control electrode; and
   a connecting means for coupling said control electrode of said auxiliary semiconductor device to a cathode of said first diode.

2. A switching power supply apparatus as claimed in claim 1 wherein said connecting means includes a resistor.

3. A switching power supply apparatus as claimed in claim 1 wherein one main electrode of said auxiliary semiconductor device is coupled to said control electrode of said auxiliary semiconductor device via a resistor.

4. A switching power supply apparatus as claimed in claim 1 wherein a third diode is inserted between the other main electrode of said auxiliary semiconductor device and an anode of said first diode.

5. A switching power supply apparatus as claimed in claim 1 or 3 wherein a capacitor is connected between an anode of said second diode and one end of said tertiary winding.

6. A switching power supply apparatus as claimed in claim 1 or 3 wherein a reactor is inserted between said one end of said tertiary winding and said one main electrode of said auxiliary semiconductor device and a fourth diode is connected between the point for coupling said reactor to said one end of said tertiary winding and said anode of said second diode.

7. A switching power supply apparatus as claimed in claim 6 wherein a feedback winding for self-excited oscillation is provided on said main transformer and said feedback winding is inserted between said control electrode of said main semiconductor device and said second main electrode of said main semiconductor device.

8. A switching power supply apparatus comprising:
   a first capacitor and a second capacitor connected in series between both electrodes of a DC power source;
   a first main semiconductor device having a control electrode and a second main semiconductor device having a control electrode, connected in series between said both electrodes of said DC power source;
   a primary winding of a main transformer connected between a point for coupling said first capacitor to said second capacitor and another point for coupling said first main semiconductor device having a control electrode to said second main semiconductor device having a control electrode;
   a first semiconductor device drive transformer having a secondary winding coupled between a control electrode of said first main semiconductor device and one main electrode thereof and having a primary winding connected to a semiconductor device drive circuit;
   a second semiconductor device drive transformer having a secondary winding coupled between a control electrode of said second main semiconductor device and one main electrode thereof and having a primary winding connected to said semiconductor device drive circuit;
   a secondary winding of said main transformer for obtaining the output according to turning on and turning off of said first and second main semiconductor devices; characterized by the provision of
   a first diode inserted between one end of said secondary winding of said first semiconductor device drive transformer and said one main electrode of said first main semiconductor device;
   another first diode inserted between one end of said secondary winding of said second semiconductor device drive transformer and said one main electrode of said second main semiconductor device;
   a tertiary winding provided on said main transformer, having one end connected to said control electrode of said first main semiconductor device via a second diode and having the other end connected to an anode of said first diode via an auxiliary semiconductor device with a control electrode;
   another tertiary winding provided on said main transformer, having one end connected to said control electrode of said second main semiconductor device via another second diode and having the other end connected to an anode of said first diode via another auxiliary semiconductor device with a control electrode;

connecting means respectively for connecting said respective control electrodes of said auxiliary semiconductor devices to said respective cathode of said first diodes.

9. A switching power supply apparatus as claimed in claim 8 wherein said connecting means include resistors respectively.

10. A switching power supply apparatus as claimed in claim 8 wherein one main electrode of said each auxiliary semiconductor device is connected to said control electrode thereof via a resistor.

11. A switching power supply apparatus as claimed in claim 8 or 9 wherein a capacitor is connected between an anode of said each second diode and said the other end of said each tertial winding.

12. A switching power supply apparatus as claimed in claim 8 or 9 or wherein a reactor is inserted between said the other end of said each tertiary winding and said each auxiliary semiconductor device and a fourth diode is connected between each point for coupling said each reactor to said each tertiary winding and each anode of said each second diode.

* * * * *